May 16, 1967 L. D. MOSIER 3,319,903
ANTI-BACKLASH ATTACHMENT FOR FISHING REELS
Filed Oct. 28, 1964
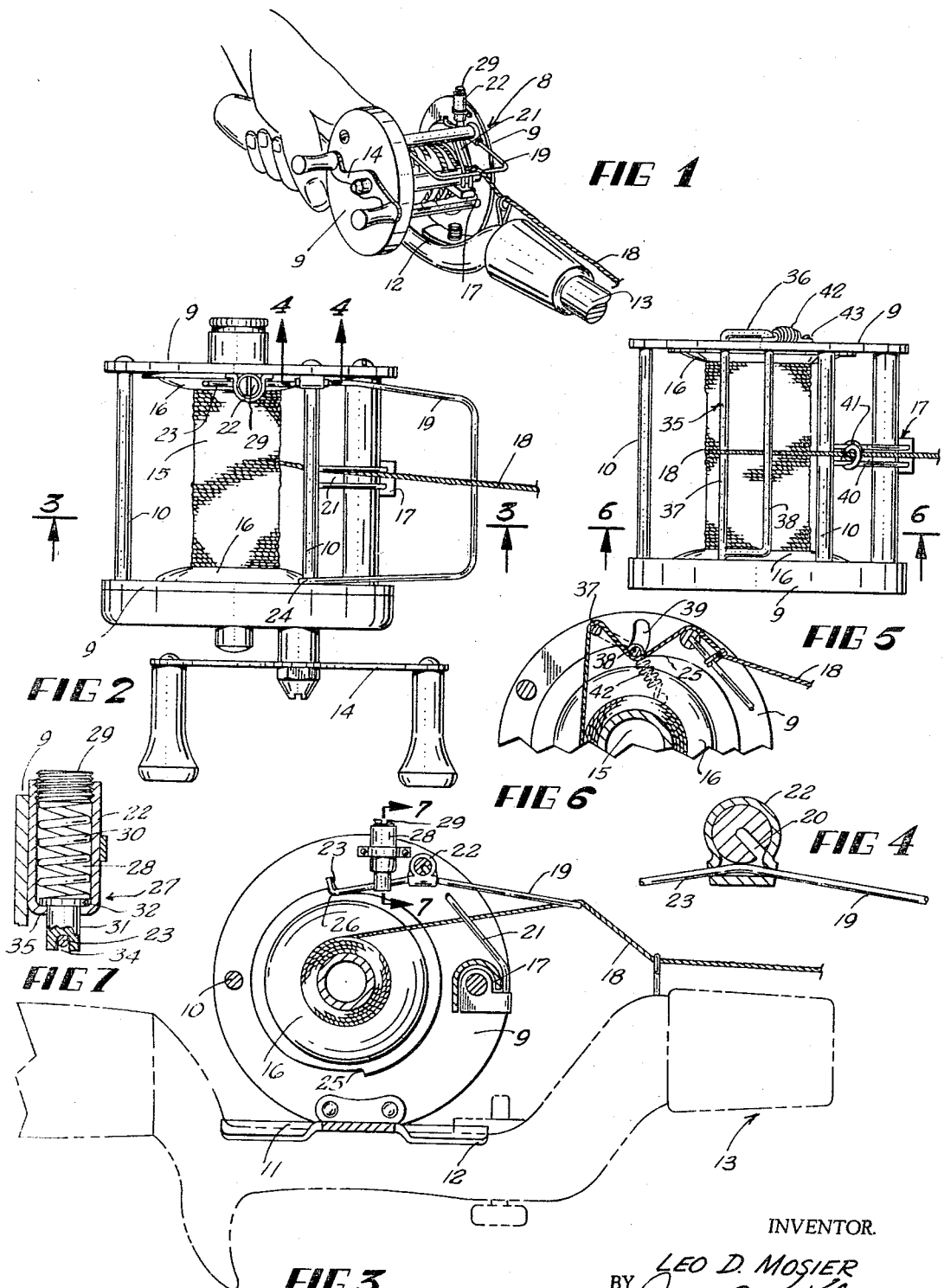
INVENTOR.
LEO D. MOSIER
BY David K. Kilgore
ATTORNEY

United States Patent Office 3,319,903
Patented May 16, 1967

3,319,903
ANTI-BACKLASH ATTACHMENT FOR
FISHING REELS
Leo D. Mosier, 4130 Lyndale Ave. N.,
Minneapolis, Minn. 55412
Filed Oct. 28, 1964, Ser. No. 407,097
2 Claims. (Cl. 242—84.52)

This invention relates broadly to fishing reels; more particularly to the type of reel commonly known as a casting reel; and specifically to an attachment for fishing reels of the class described which operates automatically to prevent backlash of the fishing line, which occurs when said line winds back onto the forward-spinning spool as the said fishing line goes slack and the spinning spool overruns the diminished momentum of the terminal tackle attached to said fishing line.

Thus, the principal object of the invention is to provide an attachment for fishing reels whereby the inherent tendency of the line loaded reel spool to overrun the fishing line and its terminal tackle is automatically overcome.

A still further object of this invention is to provide a conventional type of casting reel with an anti-backlash device that is motivated and regulated by the action of the fishing line when the same is cast from the spool of the said fishing reel.

Still another object of this invention is to provide a simple and effective automatic anti-backlash device applicable to conventional casting reels wherein said device is mounted externally on said reel and acts upon the external surfaces thereof.

A still further object of this invention is to provide a simple and effective automatic anti-backlash device applicable to any conventional casting reel not equipped with anti-backlash means.

These and other objects of the invention will become apparent from the following specification and claims when taken in conjunction with the accompanying drawing which forms a part of this application, in which drawing, like characters indicate like parts throughout the several views.

To the above end, generally stated, the invention consists of the following devices and combination of devices, hereinafter described and defined in the claims.

Referring to the drawing:

FIG. 1 is a perspective view of a conventional casting reel with the invention mounted thereon and including a fishing rod fragmentarily shown as a mounting station for said reel.

FIG. 2 is a top plan view of a conventional casting reel also showing the respective elements of the invention mounted thereon.

FIG. 3 is a side elevational view of a conventional casting reel taken on the line 3—3 of FIG. 2 showing the several elements of the invention mounted thereon, said casting reel being shown as mounted on a fragmentary portion of a casting rod.

FIG. 4 is a fragmentary view partly in section taken on the line 4—4 of FIG. 2.

FIG. 5 is a top plan view of a conventional casting reel showing a modified form of the invention mounted thereon.

FIG. 6 is a fragmentary side elevational view of a conventional casting reel illustrating the modification of FIG. 5 on an enlarged scale taken on the line 6—6 of FIG. 5 and, FIG. 7 is a fragmentary elevational view on an enlarged scale of the adjusting means of the invention, taken on the line 7—7 of FIG. 3.

Referring now more specifically to the drawing, the casting reel which will hereinafter be referred to as the reel 8, is of the conventional type having a pair of opposed end plates 9 held in assembled relation by a plurality of cross-rods 10 and a foot 11 whereby the reel 8 is detachably mounted in a reel seat 12 on the fishing rod 13, fragmentarily shown on the drawing.

The reel 8 is provided with the conventional type of reel crank 14 which in turn is connected by gearing, not shown, to the reel spool 15 having end flanges 16 which are journaled in the end plates 9 of the reel 8. The said reel 8 being of the casting type is provided at its forward portion with conventional level wind mechanism 17 whereby the fishing line 18 stored on the reel spool 15 is automatically laid on the said spool as the said line is retrieved after being cast from the reel 8. It will be understood, however, that this level wind mechanism is not necessarily important to the operation and installation of the subject invention which can be applied to any casting type reel.

The elements of the reel 8 thus far described are conventional to all casting type reels and the invention proper will now hereinafter be described more in detail.

The reference numeral 19 refers to a relatively wide bail-like rigid wire member that is pivotally mounted at its rear end portions on one of the cross rods 10, the rod usually having a transversely disposed slot 20 which supports and guides the inner end portion of the line guide 21 of the level wind mechanism 17.

The bail-like member 19 as shown on the drawing, is mounted on the left hand side of the cross rod 10 by means of a collar 22 that encircles the cross rod 10 and which is provided with a transverse bore, see FIG. 4, in which the said bail-like member 19, and as shown on the drawing, a rearwardly and downwardly inclined projection 23 thereof is secured rigidly, the purpose of which will presently appear. The drawings illustrate only a simple mounting sleeve 22 on the left hand side of the reel 8 to pivotally mount the bail-like member, the right hand rear end portion of said member being terminated in an eye 24 that encircles the cross rod 10 with relatively free working fit.

The rearwardly and downwardly inclined projection of the one side of the bail-like member is in frictional engagement with a pair of relatively long transversely opposed peripheral cam-like notches 25 formed in the end flange 16 of the reel spool 15. It is important to note at this point that the heel 26 of the rearward projection 23 of the bail-like member 19 is upturned merely to facilitate its co-operating movements relative the cam-like notch or notches 25. It will be obvious that the said upturned heel 26 of the rearward projection 23 is merely one way of shaping the terminal portion of said rearward projection 23 for easily riding into and out of engagement with said notch 25 and for riding easily and smoothly on the flange 16 of the reel spool 15. Other shapes of the rearward projection 23 readily suggest themselves.

Adjusting means to provide selectively variable tension on the rearward projection 23 of the bail-like member 19 is provided by mounting an adjustable spring loaded tensioning device 27 on the inner surface of the reel end plate 9 immediately above the rearwardly projecting rearward projection 23 of the bail-like member 19. This tensioning device 27 is relatively small and unobtrusive and comprises a cylindrical housing 28 internally screw-threaded at its upper end portion, see FIG. 7, and having engagement with a short screw threaded adjusting screw 29. This adjusting screw 29 has engagement with a coiled spring 30 which acts interposed between the said adjusting screw and a plunger 31 mounted within the housing and projecting outwardly of the bottom of said housing. The said plunger 31 at its upper end portion is provided with a flange 32 whereby its downward movement is limited by contact with a stop shoulder 33 formed in the lower end portion of the said housing 28. The lower end portion of the plunger 31 is notched at 34 for saddle-like engagement with the rearward projection 23 of the bail-like member 19. Obviously, by means of the adjusting screw 29 acting on the coiled spring 30 and the plunger 31, the tension of the said rearward projection 23 acting on notched end flange 16 of the reel spool 15 may be adjusted selectively according to a given reel and its fishing line size and load and the weight of the terminal tackle being used. Other kinds of adjustable spring tension may be used.

It will thus be seen that with the said rearward projection 23 of the bail-like member 19 adjusted as above, there will be no overrun of the reel spool 15 thereby causing what is well known as a backlash during a casting procedure. It will be further understood that the tension of the rearward projection 23 of the bail-like member 19 will be relatively light and will have little effect upon the distance to which terminal tackle, not shown, secured to the end of the fishing line 18 may be cast.

The action of the terminal part or heel 26 of the rearward projection 23, upon the slackening of the pull of the fishing line, simply places enough pressure on the line loaded and forward spinning reel to cause the terminal or heel 26 to engage the notch 25 on the end flange of the reel spool 15, thus causing the reel to stop its forward spin and prevent the overrun and ensuing backlash.

A simple modified form of the invention is disclosed in FIGS. 5 and 6 of the drawing. This modification of the invention generally embodies all of the elements of a conventional casting type reel, including the cam-like notch 25 in one of the end flanges 16 of the reel spool 15. However, in place of the forwardly projected bail-like member 19, there is provided a substantially smaller rectangular shaped wire bail 35 that is pivotally mounted in the end plates 9 of the reel 8. As best seen in FIG. 5, one end portion of the bail 35 is mounted so that its end portion 36 extends outwardly of its corresponding end plate 9 and the other end portion 37 thereof is mounted to operate within the said end plates. The rear longitudinal run 37 of this wire bail 35 is mounted in bores in the said end plates and the forward run 38 thereof at the left hand side thereof operates in a small elliptical slot 39 formed in the left hand end plate 9 of the reel 8. It is important to note at this point that in order to achieve proper line action on the bail 35 the line guide 40 of the level wind apparatus 17 is provided with an eye 41 rigidly secured thereto.

The forward longitudinal run 38 of the bail 35 is normally held in engagement with the notches 25 formed in the end flange 16 of the reel of the reel spool 15 by means of a relatively small coiled spring 42 being under tension, said coiled spring 42 being secured at one end portion thereof to the outward projection 36 of the bail 35 and the other end portion thereof anchored in the end plate of the reel 8, by means of a small screw 43.

The fishing line 18 is threaded under the forward portion 38 of the bail and over the rearward portion 37 thereof, so that when the fishing line 18 is taught the portion 38 of the bail 36 will be lifted and thereby disengaged from the notch 25, and when said fishing line 18 is slack the portion 38 of the bail 36 will engage the notch 25 and thus stop the spool 15 by reason of spring tension provided by the spring 42, and thereby prevent overrun and backlash as herein previously described.

As has been previously noted, the entire action of both forms of the invention described above is controlled by the action of the fishing line 18 and its terminal tackle, not shown, acting on the bails having engagement with the notches 25 of the reel spool 15. When the fishing line 18 is being cast from the reel spool 15 by the momentum imparted by the weight of the terminal tackle, tension or engagement of the spring loaded bails will be lessened thereby permitting a cast of substantially normal distance. As the momentum of the terminal tackle and the line loaded reel spool 15 is reduced upon the approach of the end of the cast, the tension or pull on the line is substantially lessened and eventually completely stopped, the action of the bails will be to engage the notches 25 of the reel spool thereby stopping the spool and preventing the backlash of the line caused by the overrun of the line loaded reel spool 15. It will be obvious that the invention will in on way interfere with normal retrieving of the fishing line 18 onto the reel spool 15 by virtue of the shape of the notch 25 on the spool flange 16 cooperating with the terminal part or heel 26 of the rearward projection 23 of the bail-like member 19 or rear longitudinal run 37 of the small bail 35 which is round in cross-section.

Thus, to briefly review the operation of the forms of the invention herein described, the fishing line 18 and its terminal tackle, not shown, are cast from the reel 8 in a normal manner and in view of the action of the bails 19 and 35 as shown, the cast will be normal in every respect with the exception that the line loaded reel spool will need no thumbing by the fisherman to prevent the usual backlash caused by the overrun of the reel spool 15 and its fishing line 18.

To rewind or load the reel spool with the fishing line 18 in that form of the invention shown in FIGS. 1, 2, and 5, it will be seen that the line is drawn backward from the eyelets of the fishing rod 13 over the bail-like member 19, then threaded through the line guide 21 and then onto the backward turning reel 15, the rearward projection 23 easily riding over the notch 25 by reason of the cam-like construction of the forward portion of the notch 25.

In that form of the invention shown in FIGS. 5 and 6, the fishing line 18 is passed from the reel spool 15 over the rear run 37 of the bail 35, thence under the forward run 38 thereof, then through the eye 41 carried by the line guide 40 of the level wind mechanism 17 and thence threaded through the line guides of the fishing rod 13.

While there are herein disclosed but a limited number of embodiments of the structure, process, and product of the invention herein presented, it is possible to produce still other embodiments without departing from the inventive concept herein disclosed, and it is desired therefore, that only such limitations be imposed on the appended claims as are stated herein or required by the prior art.

What I claim is:

1. An anti-backlash device for a fishing reel of the casting type having a pair of laterally spaced end plates held in assembled relation by means of a plurality of cross-rods and a reel spool having opposed end flanges journaled in said end plates, said anti-backlash device comprising a pivotally mounted forwardly projected bail-like member having a transverse member extending between the said end plates of the reel above the central longitudinal axis of the reel spool and substantially forwardly thereof, said bail-like member having at least one rearwardly projecting arm on one side portion thereof in close proximity to one side plate of the reel wherein the said projecting arm overlies the reel spool, and at least one cam-like notch formed in the end flange of the spool for engagement with the said rearwardly projecting arm of the bail-like member, said bail-like member and its rearwardly projecting arm being actuated by the action of the fishing line thereon wherein, as the said fishing line, pulled by its terminal tackle, runs over the transverse member of the bail-like member and automatically controls the engagement of the rearwardly projecting arm with the notch in the flange of the reel spool, releasing such engagement as the cast initiates line pressure on the bail-like member and, conversely, spring means for urging the said rearwardly projecting arm into engagement with said notch as the fishing line releases pressure on said bail-like member when said fishing line goes slack at the end of the cast, the resulting engagement of said rearwardly projecting arm with said notch completely stopping the overrun of the line loaded reel spool, said spring means including adjustable means whereby the tensioning of the rearwardly projecting arm of the bail-like member on the notches in the flange plate of the reel spool may be selectively varied, said adjustable means being mounted on the inner surface of one of the end plates of the reel in vertically disposed alignment with the rearwardly projecting arm of the bail-like member and comprising a small housing mounted on said end plates and having a spring loaded plunger the lower end portion of which is notched to engage the said rearwardly projecting arm and an adjusting screw having screw threaded engagement with the said housing, a spring interposed between said plunger and the adjusting screw wherein the tension of the notched plunger on the rearwardly projecting arm may be varied by adjustment of the said screw.

2. The structure of claim 1 wherein the rearwardly projecting arm of the bail-like member is a spring affording cooperation with the spring means in the housing mounted on the inner surface of at least one end plate of said reel to thus afford means whereby the engagement of the bail-like member and the nothces in the reel spool is cushioned.

References Cited by the Examiner

UNITED STATES PATENTS

| | | | |
|---|---|---|---|
| 1,420,428 | 6/1922 | Hertenstein | 242—84.52 |
| 1,960,491 | 5/1934 | Johnson | 242—84.52 |
| 2,601,021 | 6/1952 | Hoot | 242—84.52 |
| 2,658,696 | 11/1953 | Cooper | 242—84.52 |

FRANK J. COHEN, *Primary Examiner.*

BILLY S. TAYLOR, *Examiner.*